United States Patent
Yao et al.

(10) Patent No.: US 11,354,875 B2
(45) Date of Patent: Jun. 7, 2022

(54) VIDEO BLENDING METHOD, APPARATUS, ELECTRONIC DEVICE AND READABLE STORAGE MEDIUM

(71) Applicant: BEIJING BAIDU NETCOM SCIENCE AND TECHNOLOGY CO., LTD., Beijing (CN)

(72) Inventors: Kun Yao, Beijing (CN); Zhibin Hong, Beijing (CN); Hanqi Guo, Beijing (CN); Xusheng Zeng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/020,968

(22) Filed: Sep. 15, 2020

(65) Prior Publication Data

US 2021/0225089 A1   Jul. 22, 2021

(30) Foreign Application Priority Data

Jan. 20, 2020   (CN) .......................... 202010065820.4

(51) Int. Cl.
*G06T 19/20*   (2011.01)
*G06T 15/04*   (2011.01)
*G06T 17/20*   (2006.01)

(52) U.S. Cl.
CPC .............. *G06T 19/20* (2013.01); *G06T 15/04* (2013.01); *G06T 17/20* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 2002/0012454 A1* | 1/2002 | Liu | G06K 9/00281 382/118 |
| 2009/0132371 A1* | 5/2009 | Strietzel | G06T 15/00 705/14.46 |

(Continued)

OTHER PUBLICATIONS

Dale K, Sunkavalli K, Johnson MK, Vlasic D, Matusik W, Pfister H. Video face replacement. Proceedings of the 2011 SIGGRAPH Asia conference Dec. 12, 2011 (pp. 1-10).*

(Continued)

*Primary Examiner* — Sultana M Zalalee
(74) *Attorney, Agent, or Firm* — Brooks Kushman P.C.

(57) ABSTRACT

The present disclosure provides a video blending method, apparatus, electronic device and readable storage medium, and relates to computer vision technologies. A specific implementation solution is as follows: obtaining a predicted 3D face mesh of a facial image in each video frame images of the user video according to each video frame image of a user video and each video frame image of a template video; obtaining a predicted texture of the predicted 3D face mesh according to a user texture of a user 3D face mesh of the facial image in each video frame image of the user video and a template texture of a template 3D face mesh of the facial image in each video frame image of the template video; obtaining a rendered facial image of the predicted 3D face mesh according to the predicted 3D face mesh, the predicted texture and user face posture, and template face posture; performing blending processing for the rendered facial image and each video frame image of the template video to obtain a blended video frame image after the blending; performing synthesis processing for the blended video frame image to obtain a blended video.

16 Claims, 2 Drawing Sheets

(56) References Cited

U.S. PATENT DOCUMENTS

| | | | |
|---|---|---|---|
| 2009/0219280 A1* | 9/2009 | Maillot | G06T 15/04 345/419 |
| 2009/0273612 A1* | 11/2009 | Xie | G02C 13/003 345/630 |
| 2010/0150406 A1* | 6/2010 | Xiao | G06T 11/00 382/118 |
| 2016/0078280 A1* | 3/2016 | Tai | G06T 13/80 382/118 |
| 2016/0350618 A1* | 12/2016 | Meekins | A63F 13/327 |
| 2017/0301125 A1* | 10/2017 | Bouaziz | G06T 7/292 |
| 2018/0157901 A1* | 6/2018 | Arbatman | H04L 12/1827 |
| 2018/0190322 A1* | 7/2018 | Zukerman | G06T 11/40 |
| 2018/0253593 A1* | 9/2018 | Hu | G06T 17/00 |
| 2019/0035149 A1* | 1/2019 | Chen | G06T 7/50 |
| 2019/0080508 A1* | 3/2019 | Johnson | H04N 5/232939 |
| 2019/0122411 A1* | 4/2019 | Sachs | G06T 7/248 |
| 2020/0013212 A1* | 1/2020 | Wang | G06T 15/506 |
| 2020/0234034 A1* | 7/2020 | Savchenkov | G06T 11/60 |

OTHER PUBLICATIONS

Cheng, Yi-Ting, Virginia Tzeng, Yu Liang, Chuan-Chang Wang, Bing-Yu Chen, Yung-Yu Chuang, and Ming Ouhyoung. "3d-model-based face replacement in video." In SIGGRAPH'09: Posters, pp. 1-1. 2009.*

Blanz, Volker, and Thomas Vetter. "A morphable model for the synthesis of 3D faces." Proceedings of the 26th annual conference on Computer graphics and interactive techniques. 1999.*

\* cited by examiner

VIDEO BLENDING METHOD, APPARATUS, ELECTRONIC DEVICE AND READABLE STORAGE MEDIUM

CROSS-REFERENCE TO RELATED APPLICATIONS

The present application claims the priority of Chinese Patent Application No. 2020100658204, filed on Jan. 20, 2020, with the title of "Video blending method, apparatus, electronic device and readable storage medium". The disclosure of the above applications is incorporated herein by reference in its entirety.

TECHNICAL FIELD

The present disclosure relates to computer technologies, and specifically to computer vision technologies, and particularly to a video blending method, apparatus, an electronic device and readable storage medium.

BACKGROUND

As the Internet develops deeper, terminals can integrate more and more functions so that applications (APPs) installed on terminals emerge in endlessly. Some applications will involve video face swap, i.e., a template video and a user video are input, and then a blended video is output. In the blended video, the human face in the template video is replaced with the human face in the user video, and the remaining parts remain unchanged.

In a conventional video face swap method, key points of video frame images of the user video and the template video may be detected, facial feature positions of video frame images of the user video are aligned with facial feature positions of video frame images of the template video through the key points, then texture balance of the face in the video frame images of the user video is adjusted to get approximate to the face in the video frame images of the template video, and then the video frame images of the user video are blended with the video frame images of the template video to obtain a blended video.

However, the video blending completely based on alignment of facial feature positions of the video frame images of the user video with the facial feature positions of the video frame images of the template video according to the key points achieves an undesirable blending effect in some cases, for example, when the posture of the face in the template video is greatly different from the posture of the face in the user video.

SUMMARY

A plurality of aspects of the present disclosure provide a video blending method, apparatus, electronic device and readable storage medium, to improve a blending effect of the video blending.

In an aspect of the present disclosure, the present disclosure provides a video blending method, comprising: obtaining a predicted 3D face mesh of a facial image in each video frame image of a user video according to each video frame image of a user video and each video frame image of a template video; obtaining a predicted texture of each predicted 3D face mesh according to a user texture of a user 3D face mesh of the facial image in each video frame image of the user video and a template texture of a template 3D face mesh of the facial image in each video frame image of the template video; obtaining a rendered facial image of each predicted 3D face mesh according to each predicted 3D face mesh, the predicted texture of each predicted 3D face mesh and a user face posture of the facial image in each video frame image of the user video, and a template face posture of the facial image in each video frame image of the template video; performing blending processing for the rendered facial image of each predicted 3D face mesh and each video frame image of the template video to obtain each blended video frame image after the blending; performing synthesis processing for each blended video frame image to obtain a blended video.

The above aspect and any possible implementation mode further provide an implementation mode: the obtaining a predicted texture of each predicted 3D face mesh according to a user texture of a user 3D face mesh of the facial image in each video frame image of the user video and a template texture of a template 3D face mesh of the facial image in each video frame image of the template video comprises: performing balance processing for the user texture of each user 3D face mesh according to the template texture of each template 3D face mesh to obtain the predicted texture of each predicted 3D face mesh; or performing blending processing on the user texture of each user 3D face mesh and the template texture of each template 3D face mesh to obtain the predicted texture of each predicted 3D face mesh.

The above aspect and any possible implementation mode further provide an implementation mode: after the obtaining a predicted texture of each predicted 3D face mesh according to a user texture of a user 3D face mesh of the facial image in each video frame image of the user video and a template texture of a template 3D face mesh of the facial image in each video frame image of the template video, the method further comprises: performing smoothing processing on the predicted texture of each predicted 3D face mesh.

The above aspect and any possible implementation mode further provide an implementation mode: the obtaining a rendered facial image of each predicted 3D face mesh according to each predicted 3D face mesh, the predicted texture of each predicted 3D face mesh and a user face posture of the facial image in each video frame image of the user video, and a template face posture of the facial image in each video frame image of the template video comprises: obtaining a posture adjustment parameter according to the user face posture and the template face posture; performing posture adjustment processing on a blended face posture of the predicted 3D face mesh in the facial image in each video frame image of the user video according to the posture adjustment parameter to adjust the blended face posture from the user face posture to the template face posture; performing projection processing on the predicted 3D face mesh of the facial image in each video frame image of the user video after the posture adjustment processing; performing rendering processing on a projection result of the projection processing by using the predicted texture of each predicted 3D face mesh to obtain the rendered facial image of each predicted 3D face mesh.

The above aspect and any possible implementation mode further provide an implementation mode: the performing blending processing for the rendered facial image of each predicted 3D face mesh and each video frame image of the template video to obtain each blended video frame image after the blending comprises: obtaining a rendered mask image of the facial image in each video frame image of the user video according to a preset facial image mask, the predicted 3D face mesh of the facial image in each video frame image of the user video and a user face posture, and a template face posture of the facial image in each video frame image of the template video; and performing blending processing on the rendered mask image of the facial image in each video frame image of the user video, a rendered face image of each predicted 3D face mesh and each video frame image of the template video to obtain each blended video frame image after the blending.

The above aspect and any possible implementation mode further provide an implementation mode: the obtaining a rendered mask image of the facial image in each video frame image of the user video according to a preset facial image mask, the predicted 3D face mesh of the facial image in each video frame image of the user video and a user face posture, and a template face posture of the facial image in each video frame image of the template video comprises: obtaining a posture adjustment parameter according to the user face posture and the template face posture; performing posture adjustment processing on a blended face posture of the predicted 3D face mesh of the facial images in the each video frame image of the user video according to the posture adjustment parameter to adjust the blended face posture from the user face posture to the template face posture; performing posture adjustment processing on a preset mask face posture of the face image mask according to the posture adjustment parameter to adjust the mask face posture to the template face posture; performing projection processing on the face image mask after the posture adjustment processing and the predicted 3D face mesh of the facial image in each video frame image of the user video to obtain a rendered mask image of the facial image in each video frame image of the user video.

The above aspect and any possible implementation mode further provide an implementation mode: the obtaining a predicted 3D face mesh of a facial image in each video frame image of a user video according to each video frame image of a user video and each video frame image of a template video comprises: obtaining key points of the facial image in each video frame image of the user video and key points of the facial images in each video frame image of the template video correspondingly according to each video frame image of the user video and each video frame image of the template video, respectively; performing face fitting processing on the key points of the facial image in each video frame image of the user video and key points of the facial image in each video frame image of the template video, respectively, to obtain face prediction parameters of the facial images in each video frame image of the user video and face prediction parameters of the facial image in each video frame image of the template video; wherein the face prediction parameters include a weight of a face shape parameter, a weight of a facial expression parameter and a face rotation parameter; obtaining a predicted 3D face mesh of the facial image in each video frame image of the user video according to the weight of the face shape parameter and the weight of the facial expression parameter of the facial image in each video frame image of the user video, and a weight of the face shape parameter of the facial image in each video frame image of the template video.

The above aspect and any possible implementation mode further provide an implementation mode: before obtaining a predicted texture of each predicted 3D face mesh according to a user texture of a user 3D face mesh of the facial image in each video frame image of the user video and a template texture of a template 3D face mesh of the facial image in each video frame image of the template video, the method further comprises: generating a user expressionless 3D face mesh of the facial image in each video frame image of the user video by using a preset expressionless basic face shape, weights of face shape parameters of the facial images in the video frame images of the user video, and preset face shape parameters; generating a user with-expression 3D face mesh of the facial image in each video frame image of the user video by using the weights of face shape parameters of the facial image in each video frame image of the user video and preset face shape parameters, and weights of the facial expression parameters of the facial image in each video frame image of the user video and preset facial expression parameters; performing blending processing for the user expressionless 3D face mesh and the user with-expression 3D face mesh to obtain the user 3D face mesh of the facial image in each video frame image of the user video; using the user 3D face meshes to perform sampling processing for the facial image in each video frame image of the user video to obtain the user texture of each user 3D face mesh.

The above aspect and any possible implementation mode further provide an implementation mode: the obtaining a predicted 3D face mesh of the facial image in each video frame image of the user video according to the weight of the face shape parameter and the weight of the facial expression parameter of the facial image in each video frame image of the user video, and a weight of the face shape parameter of the facial image in each video frame image of the template video comprises: generating a user expressionless 3D face mesh of the facial image in each video frame image of the user video by using a preset expressionless basic face shape, weights of face shape parameters of the facial image in each video frame image of the user video, and preset face shape parameters; generating a template expressionless 3D face mesh of the facial image in each video frame image of the template video by using the preset expressionless basic face shape, weights of face shape parameters of the facial image in each video frame image of the template video and preset face shape parameters; performing blending processing for the user expressionless 3D face mesh and the template expressionless 3D face mesh to obtain a blended expressionless 3D face mesh; obtaining a blended with-expression 3D face mesh according to the blended expressionless 3D face mesh, and weights of facial expression parameters of the facial image in each video frame image of the user video, and preset facial expression parameters; and performing blending processing for the blended with-expression 3D face mesh and the user 3D face mesh to obtain the predicted 3D face mesh of the facial image in each video frame image of the user video.

The above aspect and any possible implementation mode further provide an implementation mode: before obtaining a predicted texture of each predicted 3D face mesh according to a user texture of a user 3D face mesh of the facial image in each video frame image of the user video and a template texture of a template 3D face mesh of the facial image in each video frame image of the template video, the method comprises: generating a template expressionless 3D face mesh of the facial image in each video frame image of the template video by using a preset expressionless basic face shape, weights of face shape parameters of the facial image in each video frame image of the template video, and preset face shape parameters; generating a template with-expression 3D face mesh of the facial image in each video frame image of the template video by using the weights of face shape parameters of the facial image in each video frame image of the template video and the preset face shape parameters, and weights of the facial expression parameters of the facial image in each video frame image of the template video and preset facial expression parameters;

performing blending processing for the template expressionless 3D face mesh and the template with-expression 3D face mesh to obtain the template 3D face mesh of the facial image in each video frame image of the template video; using the template 3D face meshes to perform sampling processing for the facial image in each video frame image of the template video to obtain the template texture of the template 3D face mesh.

In another aspect of the present disclosure, there is provided a video blending apparatus, comprising: a 3D prediction unit configured to obtain a predicted 3D face mesh of a facial image in each video frame image of a user video according to each video frame image of a user video and each video frame image of a template video; a texture prediction unit configured to obtain a predicted texture of each predicted 3D face mesh according to a user texture of a user 3D face mesh of the facial image in each video frame image of the user video and a template texture of a template 3D face mesh of the facial image in each video frame image of the template video; a projection rendering unit configured to obtain a rendered facial image of each predicted 3D face mesh according to each predicted 3D face mesh, the predicted texture of each predicted 3D face mesh and a user face posture of the facial image in each video frame image of the user video, and a template face posture of the facial image in each video frame image of the template video; an image blending unit configured to perform blending processing for the rendered facial image of each predicted 3D face mesh and each video frame image of the template video to obtain each blended video frame image after the blending; a video synthesis unit configured to perform synthesis processing for each blended video frame image to obtain a blended video.

The above aspect and any possible implementation mode further provide an implementation mode: the texture prediction unit is specifically configured to perform balance processing for the user texture of each user 3D face mesh according to the template texture of each template 3D face mesh to obtain the predicted texture of each predicted 3D face mesh; or perform blending processing on the user texture of each user 3D face mesh and the template texture of each template 3D face mesh to obtain the predicted texture of each predicted 3D face mesh.

The above aspect and any possible implementation mode further provide an implementation mode: the texture prediction unit is further configured to perform smoothing processing on the predicted texture of each predicted 3D face mesh.

The above aspect and any possible implementation mode further provide an implementation mode: the projection rendering unit is specifically configured to obtain a posture adjustment parameter according to the user face posture and the template face posture; perform posture adjustment processing on a blended face posture of the predicted 3D face mesh in the facial image in each video frame image of the user video according to the posture adjustment parameter to adjust the blended face posture from the user face posture to the template face posture; perform projection processing on the predicted 3D face mesh of the facial image in each video frame image of the user video after the posture adjustment processing; perform rendering processing on a projection result of the projection processing by using the predicted texture of each predicted 3D face mesh to obtain the rendered facial image of each predicted 3D face mesh.

The above aspect and any possible implementation mode further provide an implementation mode: the image blending unit is specifically configured to obtain a rendered mask image of the facial image in each video frame image of the user video according to a preset facial image mask, the predicted 3D face mesh of the facial image in each video frame image of the user video and a user face posture, and a template face posture of the facial image in each video frame image of the template video; and perform blending processing on the rendered mask image of the facial image in each video frame image of the user video, a rendered face image of each predicted 3D face mesh and each video frame image of the template video to obtain each blended video frame image after the blending.

The above aspect and any possible implementation mode further provide an implementation mode: the image blending unit is specifically configured to obtain a posture adjustment parameter according to the user face posture and the template face posture; perform posture adjustment processing on a blended face posture of the predicted 3D face mesh of the facial images in the each video frame image of the user video according to the posture adjustment parameter to adjust the blended face posture from the user face posture to the template face posture; perform posture adjustment processing on a preset mask face posture of the face image mask according to the posture adjustment parameter to adjust the mask face posture to the template face posture; perform projection processing on the face image mask after the posture adjustment processing and the predicted 3D face mesh of the facial image in each video frame image of the user video to obtain a rendered mask image of the facial image in each video frame image of the user video.

The above aspect and any possible implementation mode further provide an implementation mode: the 3D prediction unit is specifically configured to obtain key points of the facial image in each video frame image of the user video and key points of the facial images in each video frame image of the template video correspondingly according to each video frame image of the user video and each video frame image of the template video, respectively; perform face fitting processing on the key points of the facial image in each video frame image of the user video and key points of the facial image in each video frame image of the template video, respectively, to obtain face prediction parameters of the facial images in each video frame image of the user video and face prediction parameters of the facial image in each video frame image of the template video; wherein the face prediction parameters include a weight of a face shape parameter, a weight of a facial expression parameter and a face rotation parameter; obtain a predicted 3D face mesh of the facial image in each video frame image of the user video according to the weight of the face shape parameter and the weight of the facial expression parameter of the facial image in each video frame image of the user video, and a weight of the face shape parameter of the facial image in each video frame image of the template video.

The above aspect and any possible implementation mode further provide an implementation mode: the texture prediction unit is further configured to generate a user expressionless 3D face mesh of the facial image in each video frame image of the user video by using a preset expressionless basic face shape, weights of face shape parameters of the facial images in the video frame images of the user video, and preset face shape parameters; generate a user with-expression 3D face mesh of the facial image in each video frame image of the user video by using the weights of face shape parameters of the facial image in each video frame image of the user video and preset face shape parameters, and weights of the facial expression parameters of the facial image in each video frame image of the user video and preset facial expression parameters; perform blending processing for the user expressionless 3D face mesh and the user with-expression 3D face mesh to obtain the user 3D face mesh of the facial image in each video frame image of the user video; use the user 3D face meshes to perform sampling processing for the facial image in each video frame image of the user video to obtain the user texture of each user 3D face mesh.

The above aspect and any possible implementation mode further provide an implementation mode: the texture prediction unit is specifically configured to generate a user expressionless 3D face mesh of the facial image in each video frame image of the user video by using a preset expressionless basic face shape, weights of face shape parameters of the facial image in each video frame image of the user video, and preset face shape parameters; generate a template expressionless 3D face mesh of the facial image in each video frame image of the template video by using the preset expressionless basic face shape, weights of face shape parameters of the facial image in each video frame image of the template video and preset face shape parameters; perform blending processing for the user expressionless 3D face mesh and the template expressionless 3D face mesh to obtain a blended expressionless 3D face mesh; obtain a blended with-expression 3D face mesh according to the blended expressionless 3D face mesh, and weights of facial expression parameters of the facial image in each video frame image of the user video, and preset facial expression parameters; and perform blending processing for the blended with-expression 3D face mesh and the user 3D face mesh to obtain the predicted 3D face mesh of the facial image in each video frame image of the user video.

The above aspect and any possible implementation mode further provide an implementation mode: the texture prediction unit is further configured to generate a template expressionless 3D face mesh of the facial image in each video frame image of the template video by using a preset expressionless basic face shape, weights of face shape parameters of the facial image in each video frame image of the template video, and preset face shape parameters; generate a template with-expression 3D face mesh of the facial image in each video frame image of the template video by using the weights of face shape parameters of the facial image in each video frame image of the template video and the preset face shape parameters, and weights of the facial expression parameters of the facial image in each video frame image of the template video and preset facial expression parameters; perform blending processing for the template expressionless 3D face mesh and the template with-expression 3D face mesh to obtain the template 3D face mesh of the facial image in each video frame image of the template video; use the template 3D face meshes to perform sampling processing for the facial image in each video frame image of the template video to obtain the template texture of the template 3D face mesh.

In a further aspect of the present disclosure, the present disclosure provides an electronic device, comprising: at least one processor; and a memory communicatively connected with the at least one processor; wherein, the memory stores instructions executable by the at least one processor, and the instructions are executed by the at least one processor to enable the at least one processor to perform the method in the above aspect and in any possible implementation.

In a further aspect of the present disclosure, the present disclosure provides a non-transitory computer-readable storage medium storing computer instructions therein, wherein the computer instructions are used to cause the computer to perform the method in the above aspect and in any possible implementation.

According to technical solutions of embodiments of the present disclosure, the 3D face mesh can be used to predict the face after the posture change to provide a better robustness to a larger face posture change, thereby enhancing the blending effect of the video blending.

In addition, according to the technical solutions provided by the present disclosure, the predicted 3D face mesh of the facial image in each video frame image of the user video is obtained according to each video frame image of the user video and each video frame image of the template video, so that the built 3D face mesh can simultaneously have facial features of the user video and facial features of the template video, and the blending effect of video blending can be further enhanced.

In addition, according to the technical solutions provided by the present disclosure, the predicted texture after the blending processing of the user texture obtained according to the user video and the template texture obtained according to the template video is used to enable features of the template texture to be blended into the user texture, thereby further improving the blending effect of the video blending.

In addition, according to the technical solutions provided by the present disclosure, with the smoothing processing being performed on the predicted texture after the blending processing of the user texture obtained according to the user video and the template texture obtained according to the template video, texture discontinuity caused by discontinuity of face postures of facial images in the video frame images may be weakened, and thereby the occurrence of a jitter phenomenon of face color may be avoided.

In addition, according to the technical solutions provided by the present disclosure, a blending effect between a user face edge in the blended video and the template background in the template video can be effectively improved by performing blending processing according to the face image mask having a fixed shape and preset according to facial feature positions of face textures, in cooperation with the rendered face image of the predicted 3D face mesh and each video frame image of the template video.

In addition, according to the technical solution provided by the present disclosure, the user experience can be effectively improved.

Other effects of the above aspects or possible implementations will be described hereunder in conjunction with specific embodiments.

BRIEF DESCRIPTION OF THE DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts. The figures are only intended to facilitate better understanding of the solution and not construed as limiting the present disclosure. In the figures.

DETAILED DESCRIPTION

Exemplary embodiments of the present disclosure are described below with reference to the accompanying drawings, include various details of the embodiments of the present disclosure to facilitate understanding, and should be considered as merely exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., a pair of smart glasses, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
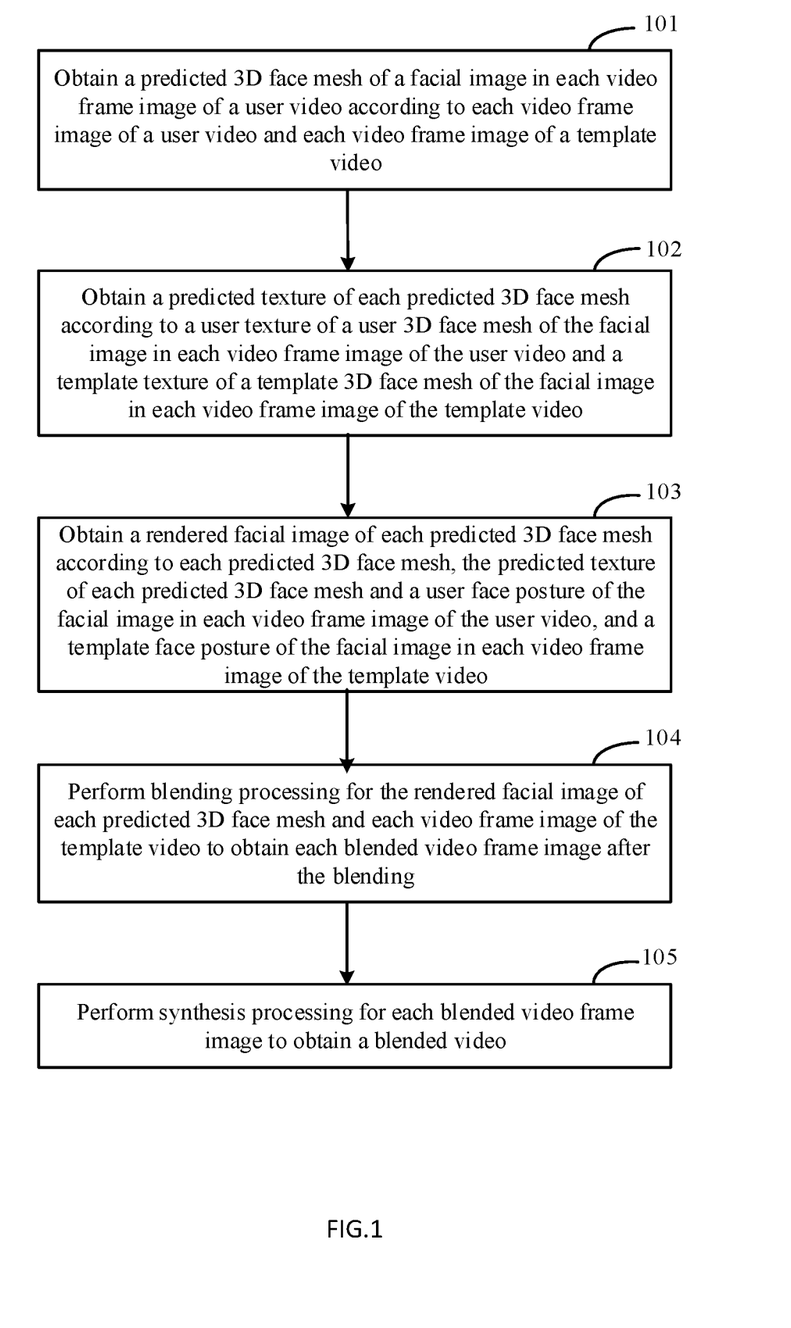
FIG. 1 illustrates a flow chart of a video blending method according to an embodiment of the present disclosure.

FIG. 1 illustrates a flow chart of a video blending method according to an embodiment of the present disclosure. As shown in FIG. 1, the method comprises the following steps:

101: obtaining a predicted 3D face mesh of a facial image in each video frame image of a user video according to each video frame image of a user video and each video frame image of a template video.

102: obtaining a predicted texture of each predicted 3D face mesh according to a user texture of a user 3D face mesh of the facial image in each video frame image of the user video and a template texture of a template 3D face mesh of the facial image in each video frame image of the template video.

103: obtaining a rendered facial image of each predicted 3D face mesh according to each predicted 3D face mesh, the predicted texture of each predicted 3D face mesh and a user face posture of the facial image in each video frame image of the user video, and a template face posture of the facial image in each video frame image of the template video.

104: performing blending processing for the rendered facial image of each predicted 3D face mesh and each video frame image of the template video to obtain each blended video frame image after the blending.

105: performing synthesis processing for each blended video frame image to obtain a blended video.

It needs to be appreciated that subjects for executing 101-105 may partially or totally be an application located in a local terminal, or a function unit such as a plug-in or Software Development Kit (SDK) located in an application of the local terminal, or a processing engine located in a network-side server, or a distributed type system located on the network side, for example, a processing engine or distributed system in the network-side video processing platform. This is not particularly limited in the present embodiment.

It may be understood that the application may be a native application (nativeAPP) installed on the terminal, or a web program (webApp) of a browser on the terminal. This is not particularly limited in the present embodiment.

As such, in the embodiment of the present disclosure, it is possible to, by predicting a human face after a posture change using the 3D face mesh, present a better robustness for a larger face posture change and thereby improve the blending effect of video blending.

Optionally, in a possible implementation of the present disclosure, at 102, specifically, balance processing is performed for the user texture of each user 3D face mesh according to the template texture of each template 3D face mesh to obtain the predicted texture of each predicted 3D face mesh.

The blending processing performed on the user textures of the user 3D face meshes and template textures of the template 3D face meshes may be specifically implemented using a preset mask.

The mask may be a stepped mask or a T-shaped mask or a mask in other shapes. This is not particularly limited in the present embodiment.

In the present embodiment, the mask may either be used to fuse the user textures and the template textures, and meanwhile may be used for a region for color transfer.

Specifically, color transfer processing may be performed for the user textures according to the user textures, the template texture and the mask. The color transfer processing may include but not limited to at least one of histogram match, linear color transfer and RGB scaling and color correction. This is not particularly limited in the present embodiment.

Then, blending processing is performed on the user textures and the template textures according to the mask. At this time, in the obtained predicted textures, the mask region is similar to the user textures, and the remaining portion is similar to the template textures.

As such, the predicted textures after blending processing of the user textures obtained according to the user video and the template textures obtained according to the template video can be used to enable features of the template textures to be blended in the user textures to thereby further enhance the blending effect of the video blending.

Optionally, in a possible implementation of the present embodiment, at 101, key points of the facial image in each video frame image of the user video and key points of the facial image in each video frame image of the template video may be obtained correspondingly according to each video frame image of the user video and each video frame image of the template video, respectively. Then, face fitting processing may be performed on the key points of the facial image in each video frame image of the user video and key points of the facial image in each video frame image of the template video, respectively, to obtain face prediction parameters of the facial image in each video frame image of the user video and face prediction parameters of the facial image in each video frame image of the template video; wherein the face prediction parameters include a weight of a face shape parameter, a weight of a facial expression parameter and a face rotation parameter. Then, the predicted 3D face meshes of the facial image in each video frame image of the user video may be obtained according to the weight of the face shape parameter and the weight of the facial expression parameter of the facial image in each video frame image of the user video, and the weight of the face shape parameter of the facial image in each video frame image of the template video.

Specifically, the video frame images of the user video may be specifically extracted from the user video. Specifically, it is specifically possible to perform video decoding processing for the user video in a video decoding manner (e.g., a video decoding manner such as x264), to obtain a data stream of the user video, obtain image data of frames according to the data stream of the user video, and then perform image encoding processing for the image data of the frames in an image encoding manner (e.g., an image encoding manner such as png, jpg, etc.), to obtain the video frame images of the user video.

Specifically, the video frame images of the template video may be specifically extracted from the template video. Specifically, it is specifically possible to perform video decoding processing for the user video in a video decoding manner (e.g., a video decoding manner such as x264), to obtain a data stream of the template video, obtain image data of frames according to the data stream of the template video, and then perform image encoding processing for the image data of the frames in an image encoding manner (e.g., an image encoding manner such as png, jpg, etc.), to obtain the video frame images of the template video.

In the present implementation, it is specifically feasible to perform key point detection processing for the facial image in each video frame image of the user video to thereby obtain the key points of the facial image in each video frame image of the user video, and perform key point detection processing for the facial image in the video frame image of the template video to thereby obtain the key points of the facial image in each video frame image of the template video.

Specifically, the key point detection processing is positioning feature points on the face such as orbit, eye, nose and mouth on the basis of face detection. At present, detection processing may be specifically performed on 150 feature points of the face. The detection processing may specifically include three steps: detecting the rim once and detecting key points of the face twice.

For example, positions of key regions of the face may be determined in the facial image in each video frame image of the user video, as key points, including eyebrows, eyes, nose, mouth, facial contour, etc.

Alternatively, again for example, positions of key regions of the face may be determined in the facial image in each video frame image of the template video, as key points, including eyebrows, eyes, nose, mouth, facial contour, etc.

The so-called weight of the face shape parameter refers to weights of face shape parameters obtained by performing face fitting processing using an expressionless basic face and face shape parameters in a preset 3D face database.

The so-called weight of the facial expression parameter refers to weights of facial expression parameters obtained by performing face fitting processing using an expressionless basic face and face shape parameters in the preset 3D face database.

The so-called face rotation parameter refers to a parameter of rotation of a face obtained by performing face fitting processing using an expressionless basic face in the preset 3D face database relative to the basic face in the 3D face database.

Furthermore, smoothing processing may be further performed on the obtained face rotation parameter. The smoothing processing here may refer to averaging the face rotation parameter of the facial image in a current video frame image and the face rotation parameter of the facial image in a preceding video frame image, and regarding the averaging result as the face rotation parameter of the facial image in the current video frame image.

The purpose of the face fitting processing is a minimal point coordinate error corresponding to the key point in a 2D face image, in a 3D face mesh obtained from a sum of the three: the expressionless basic face, the face shape parameters and the weights of the face shape parameters, and facial expression parameters and the weights of the facial expression parameters.

In a specific implementation, prior to 102, a step of obtaining the user textures of the user 3D face meshes may be further performed.

Specifically, the user expressionless 3D face mesh of the facial image in each video frame image of the user video may be specifically generated using a preset expressionless basic face shape, the weights of face shape parameters of the facial image in each video frame image of the user video, and preset face shape parameters. Then, a user with-expression 3D face mesh of the facial image in each video frame image of the user video may be generated using the weights of face shape parameters of the facial image in each video frame image of the user video and the preset face shape parameters, and weights of the facial expression parameters of the facial image in each video frame image of the user video and preset facial expression parameters. Then, blending processing may be performed for the user expressionless 3D face mesh and the user with-expression 3D face mesh to obtain the user 3D face mesh of the facial image in each video frame image of the user video, and the user 3D face meshes may be used to perform sampling processing for the facial image in each video frame image of the user video, to thereby obtain the user texture of the user 3D face mesh.

The blending processing may be performed for the user expressionless 3D face mesh and the user with-expression 3D face mesh in any of various conventional blending manners, e.g., alpha blending or Possion Blending etc.

The sampling processing herein refers to sampling, at positions of points on the user 3D face meshes, pixel values of corresponding point positions on the 2D face image in each video frame image of the user video, and thereby obtaining pixel values of points on the user 3D face mesh, as the user texture of the user 3D face mesh.

In another specific implementation, it is specifically possible to generate a user expressionless 3D face mesh of the facial image in each video frame image of the user video by using a preset expressionless basic face shape, weights of face shape parameters of the facial image in each video frame image of the user video, and preset face shape parameters, and generate a template expressionless 3D face mesh of the facial image in each video frame image of the template video by using the preset expressionless basic face shape, the weights of face shape parameters of the facial image in each video frame image of the template video and the preset face shape parameters. Then, blending processing may be performed for the user expressionless 3D face mesh and the template expressionless 3D face mesh to obtain a blended expressionless 3D face mesh. Then, a blended with-expression 3D face mesh may be obtained according to the blended expressionless 3D face mesh, and the weights of facial expression parameters of the facial image in each video frame image of the user video, and preset facial expression parameters. Finally, blending processing may be performed for the blended with-expression 3D face mesh and the user 3D face mesh obtained in the previous implementation, to obtain a predicted 3D face mesh of the facial image in each video frame image of the user video.

The blending processing may be performed for the user expressionless 3D face mesh and the template expressionless 3D face mesh in any of various conventional blending manners, and may specifically be adjusted according to the user's face shape. For example, if a chin of the user face is long, the chin of the user face may be retained, otherwise, the chin of the template face may be retained.

In another specific implementation, prior to 102, a step of obtaining the template texture of the template 3D face mesh may be further performed.

Specifically, a template expressionless 3D face mesh of the facial image in each video frame image of the template video may be specifically generated using a preset expressionless basic face shape, weights of face shape parameters of the facial image in each video frame image of the template video, and preset face shape parameters. Then, a template with-expression 3D face mesh of the facial image in each video frame image of the template video may be generated using the weights of face shape parameters of the facial image in each video frame image of the template video and the preset face shape parameters, and weights of the facial expression parameters of the facial image in each video frame image of the template video and preset facial expression parameters. Then, blending processing may be performed for the template expressionless 3D face mesh and the template with-expression 3D face mesh to obtain the template 3D face mesh of the facial image in each video frame image of the template video, and the template 3D face mesh may be used to perform sampling processing for the facial image in each video frame image of the template video, to thereby obtain the template texture of the template 3D face mesh.

The sampling processing herein refers to sampling, at positions of points on the template 3D face meshes, pixel values of corresponding point positions on the 2D face image in each video frame image of the template video, and thereby obtaining pixel values of points on the template 3D face mesh, as the template texture of the template 3D face mesh.

Optionally, in a possible implementation of the present embodiment, after 102, smoothing processing may be further performed on the predicted texture of each predicted 3D face mesh.

Specifically, the smoothing processing performed on the predicted texture of the predicted 3D face mesh may refer to averaging a predicted texture of the predicted 3D face mesh of the facial image in a current video frame image and a predicted texture of the predicted 3D face mesh of the facial image in a preceding video frame image, and regarding the averaging result as the predicted texture of the predicted 3D face mesh of the facial image in the current video frame image.

As such, with the smoothing processing being performed on the predicted texture after the blending processing of the user texture obtained according to the user video and the template texture obtained according to the template video, texture discontinuity caused by discontinuity of face postures of facial images in the video frame images may be weakened, and thereby the occurrence of a jitter phenomenon of face color may be avoided.

Optionally, in a possible implementation of the present embodiment, at 103, a posture adjustment parameter may be specifically obtained according to the user face posture and the template face posture. Then, posture adjustment processing may be performed on a blended face posture of the predicted 3D face mesh in the facial image in each video frame image of the user video according to the posture adjustment parameter, to adjust the blended face posture from the user face posture to the template face posture. Then, projection processing may be performed on the predicted 3D face mesh of the facial image in each video frame image of the user video after the posture adjustment processing. Finally, rendering processing may be performed on a projection result of the projection processing by using the predicted texture of the predicted 3D face mesh, to obtain a rendered facial image of the predicted 3D face mesh.

In a specific implementation process, regarding the obtainment of the posture adjustment parameter, a face posture parameter of the facial image in each video frame image of the user video may be specifically obtained according to a preset face posture parameter of the expressionless basic face and a face rotation parameter of the facial image in each video frame image of the user video; and a face posture parameter of the facial image in each video frame image of the template video may be obtained according to a preset face posture parameter of the expressionless basic face and a face rotation parameter of the facial image in each video frame image of the template video. Then, the posture adjustment parameter may be obtained according to the face posture parameter of the facial image in each video frame image of the user video and the face posture parameter of the facial image in each video frame image of the template video.

In the present implementation, before performing projection processing, it is necessary to rotate the blended face posture of the predicted 3D face mesh in consistency with the template face posture. Specifically, a rotation matrix may be calculated according to two sets of face posture parameters, as the posture adjustment parameter. Then, point coordinates of the predicted 3D face mesh is multiplied by the posture adjustment parameter to obtain the predicted 3D face mesh after the rotation.

After the predicted 3D face mesh after the rotation is obtained, it may be projected to a 2D plane according to a coordinate relationship of a front view of a camera.

For example, specifically, assuming that an eye of an observer who observes the predicted 3D face mesh is a mass point, and a connection line between the mass point and a center of the predicted 3D face mesh is z axis, the projection is to remove z axis coordinates to thereby obtain a 2D coordinate plane and mesh point coordinates of the predicted 3D face mesh in the 2D coordinate plane.

Coordinate points of every three predicted 3D face meshes can form a triangle, and each coordinate point can obtain a sampled texture color according to the predicted texture. Hence, after a projection result of the projection processing is obtained, it is possible to further predict that pixel values in the triangle of the predicted 3D face meshes may be filled through interpolation using pixel values of the three points. The interpolation may be a linear interpolation of the pixel values or a spline interpolation of the pixel values or other interpolations of the pixel values. This is not particularly limited in the present embodiment.

Optionally, in a possible implementation of the present embodiment, at 104, a rendered mask image of the facial image in each video frame image of the user video may be specifically obtained according to a preset facial image mask, the predicted 3D face mesh of the facial image in each video frame image of the user video and a user face posture, and a template face posture of the facial image in each video frame image of the template video. Then, blending processing may be performed on the rendered mask image of the facial image in each video frame image of the user video, the rendered face image of each predicted 3D face mesh and each video frame image of the template video, to obtain each blended video frame image after the blending.

The blending processing may be performed on the rendered mask image of the facial image in each video frame image of the user video, the rendered face image of each predicted 3D face mesh and each video frame image of the template video in any of various conventional blending manners, e.g., alpha blending or Possion Blending etc.

Specifically, a posture adjustment parameter may be specifically obtained according to the user face posture and the template face posture. Then, posture adjustment processing may be performed on a blended face posture of the predicted 3D face mesh of the facial image in each video frame image of the user video according to the posture adjustment parameter, to adjust the blended face posture from the user face posture to the template face posture. Then, posture adjustment processing may be performed on a preset mask face posture of the face image mask according to the posture adjustment parameter, to adjust the mask face posture to the template face posture. Finally, projection processing may be performed on the face image mask after the posture adjustment processing and the predicted 3D face mesh of the facial image in each video frame image of the user video, to obtain the rendered mask image of the facial image in each video frame image of the user video.

The face image mask employed in the present embodiment may be a face image mask having a fixed shape and preset according to facial feature positions of face textures, wherein a facial image range reserved for blending is preset.

As such, a blending effect between a user face edge in the blended video and the template background in the template video can be effectively improved by performing blending processing according to the face image mask having a fixed shape and preset according to facial feature positions of face textures, in cooperation with the rendered face image of the predicted 3D face mesh and each video frame image of the template video.

After the blended video frame images after the blending are obtained, an image polishing processing may be performed for the blended video frame images. Then, image decoding processing may be performed for the blended video frame images to obtain image data of original frames, then the image data of the frames may be concatenated into a data stream, and then video encoding processing be performed to obtain the blended video.

In the present embodiment, the 3D face mesh can be used to predict the face after the posture change to provide a better robustness to a larger face posture change, thereby enhancing the blending effect of the video blending.

In addition, according to the technical solution provided by the present disclosure, the predicted 3D face mesh of the facial image in each video frame image of the user video is obtained according to each video frame image of the user video and each video frame image of the template video, so that the built 3D face mesh can simultaneously have facial features of the user video and facial features of the template video, and the blending effect of video blending can be further enhanced.

In addition, according to the technical solution provided by the present disclosure, the predicted texture after the blending processing of the user texture obtained according to the user video and the template texture obtained according to the template video is used to enable features of the template texture to be blended into the user texture, thereby further improving the blending effect of the video blending.

In addition, according to the technical solution provided by the present disclosure, with the smoothing processing being performed on the predicted texture after the blending processing of the user texture obtained according to the user video and the template texture obtained according to the template video, texture discontinuity caused by discontinuity of face postures of facial images in the video frame images may be weakened, and thereby the occurrence of a jitter phenomenon of face color may be avoided.

In addition, according to the technical solution provided by the present disclosure, a blending effect between a user face edge in the blended video and the template background in the template video can be effectively improved by performing blending processing according to the face image mask having a fixed shape and preset according to facial feature positions of face textures, in cooperation with the rendered face image of the predicted 3D face mesh and each video frame image of the template video.

In addition, according to the technical solution provided by the present disclosure, the user experience can be effectively improved.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
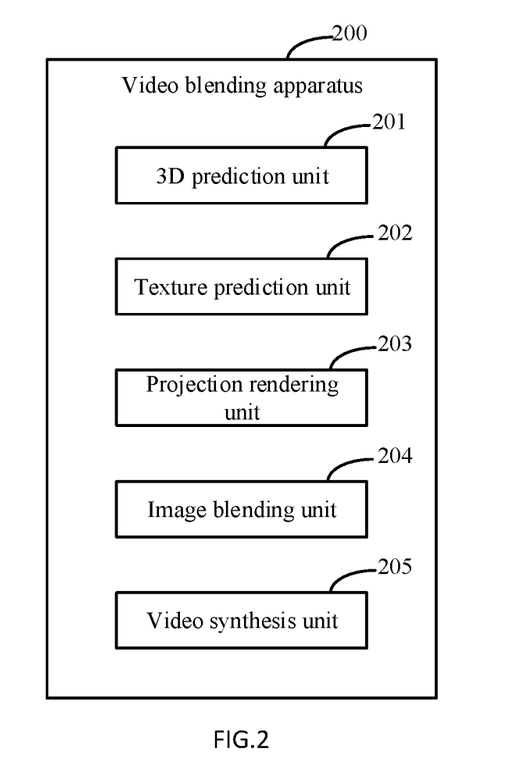
FIG. 2 illustrates a structural schematic diagram of a video blending apparatus according to another embodiment of the present disclosure.

FIG. 2 illustrates a structural schematic diagram of a video blending apparatus according to another embodiment of the present disclosure. As shown in FIG. 2, the video blending apparatus 200 of the present embodiment may comprise a 3D prediction unit 201, a texture prediction unit 202, a projection rendering unit 203, an image blending unit 204 and a video synthesis unit 205. The 3D prediction unit 201 is configured to obtain a predicted 3D face mesh of a facial image in each video frame image of a user video according to each video frame image of a user video and each video frame image of a template video; the texture prediction unit 202 is configured to obtain predicted a predicted texture of each predicted 3D face mesh according to a user texture of a user 3D face mesh of the facial image in each video frame image of the user video and a template texture of a template 3D face mesh of the facial image in each video frame image of the template video; the projection rendering unit 203 is configured to obtain a rendered facial image of each predicted 3D face mesh according to each predicted 3D face mesh, the predicted texture of each predicted 3D face mesh and a user face posture of the facial image in each video frame image of the user video, and a template face posture of the facial image in each video frame image of the template video; the image blending unit 204 is configured to perform blending processing for the rendered facial image of each predicted 3D face mesh and each video frame image of the template video to obtain each blended video frame image after the blending; the video synthesis unit 205 is configured to perform synthesis processing for each blended video frame image to obtain a blended video.

It needs to be appreciated that subjects for executing the video blending apparatus according to the present embodiment may partially or totally be an application located in a local terminal, or a function unit such as a plug-in or Software Development Kit (SDK) located in an application of the local terminal, or a processing engine located in a network-side server, or a distributed type system located on the network side, for example, a processing engine or distributed system in the network-side video processing platform. This is not particularly limited in the present embodiment.

It may be understood that the application may be a native application (nativeAPP) installed on the terminal, or a web program (webApp) of a browser on the terminal. This is not particularly limited in the present embodiment.

Optionally, in a possible implementation of the present disclosure, the texture prediction unit 202 is specifically configured to perform balance processing for the user texture of each user 3D face mesh according to the template texture of each template 3D face mesh to obtain the predicted texture of each predicted 3D face mesh; or perform blending processing on the user texture of each user 3D face mesh and the template texture of each template 3D face mesh to obtain the predicted texture of each predicted 3D face mesh.

Optionally, in a possible implementation of the present disclosure, the texture prediction unit 202 is specifically configured to perform smoothing processing on the predicted texture of each predicted 3D face mesh.

Optionally, in a possible implementation of the present disclosure, the projection rendering unit 203 is specifically configured to obtain a posture adjustment parameter according to the user face posture and the template face posture; perform posture adjustment processing on a blended face posture of the predicted 3D face mesh in the facial image in each video frame image of the user video according to the posture adjustment parameter to adjust the blended face posture from the user face posture to the template face posture; perform projection processing on the predicted 3D face mesh of the facial image in each video frame image of the user video after the posture adjustment processing; perform rendering processing on a projection result of the projection processing by using the predicted texture of each predicted 3D face mesh to obtain the rendered facial image of each predicted 3D face mesh.

Optionally, in a possible implementation of the present disclosure, the image blending unit 204 is specifically configured to obtain a rendered mask image of the facial image in each video frame image of the user video according to a preset facial image mask, the predicted 3D face mesh of the facial image in each video frame image of the user video and a user face posture, and a template face posture of the facial image in each video frame image of the template video; and perform blending processing on the rendered mask image of the facial image in each video frame image of the user video, a rendered face image of each predicted 3D face mesh and each video frame image of the template video to obtain each blended video frame image after the blending.

In a possible implementation of the present disclosure, the image blending unit 204 is specifically configured to obtain a posture adjustment parameter according to the user face posture and the template face posture; perform posture adjustment processing on a blended face posture of the predicted 3D face mesh of the facial images in the each video frame image of the user video according to the posture adjustment parameter to adjust the blended face posture from the user face posture to the template face posture; perform posture adjustment processing on a preset mask face posture of the face image mask according to the posture adjustment parameter to adjust the mask face posture to the template face posture; perform projection processing on the face image mask after the posture adjustment processing and the predicted 3D face mesh of the facial image in each video frame image of the user video to obtain a rendered mask image of the facial image in each video frame image of the user video.

Optionally, in a possible implementation of the present disclosure, the 3D prediction unit 201 is specifically configured to obtain key points of the facial image in each video frame image of the user video and key points of the facial images in each video frame image of the template video correspondingly according to each video frame image of the user video and each video frame image of the template video, respectively; perform face fitting processing on the key points of the facial image in each video frame image of the user video and key points of the facial image in each video frame image of the template video, respectively, to obtain face prediction parameters of the facial images in each video frame image of the user video and face prediction parameters of the facial image in each video frame image of the template video; wherein the face prediction parameters include a weight of a face shape parameter, a weight of a facial expression parameter and a face rotation parameter; obtain a predicted 3D face mesh of the facial image in each video frame image of the user video according to the weight of the face shape parameter and the weight of the facial expression parameter of the facial image in each video frame image of the user video, and a weight of the face shape parameter of the facial image in each video frame image of the template video.

In a possible implementation of the present disclosure, the texture prediction unit 202 is further configured to generate a user expressionless 3D face mesh of the facial image in each video frame image of the user video by using a preset expressionless basic face shape, weights of face shape parameters of the facial images in the video frame images of the user video, and preset face shape parameters; generate a user with-expression 3D face mesh of the facial image in each video frame image of the user video by using the weights of face shape parameters of the facial image in each video frame image of the user video and preset face shape parameters, and weights of the facial expression parameters of the facial image in each video frame image of the user video and preset facial expression parameters; perform blending processing for the user expressionless 3D face mesh and the user with-expression 3D face mesh to obtain the user 3D face mesh of the facial image in each video frame image of the user video; use the user 3D face meshes to perform sampling processing for the facial image in each video frame image of the user video to obtain the user texture of each user 3D face mesh.

In the implementation, the texture prediction unit 202 is specifically configured to generate a user expressionless 3D face mesh of the facial image in each video frame image of the user video by using a preset expressionless basic face shape, weights of face shape parameters of the facial image in each video frame image of the user video, and preset face shape parameters; generate a template expressionless 3D face mesh of the facial image in each video frame image of the template video by using the preset expressionless basic face shape, weights of face shape parameters of the facial image in each video frame image of the template video and preset face shape parameters; perform blending processing for the user expressionless 3D face mesh and the template expressionless 3D face mesh to obtain a blended expressionless 3D face mesh; obtain a blended with-expression 3D face mesh according to the blended expressionless 3D face mesh, and weights of facial expression parameters of the facial image in each video frame image of the user video, and preset facial expression parameters; and perform blending processing for the blended with-expression 3D face mesh and the user 3D face mesh to obtain the predicted 3D face mesh of the facial image in each video frame image of the user video.

In another specific implementation, the texture prediction unit 202 is further configured to generate a template expressionless 3D face mesh of the facial image in each video frame image of the template video by using a preset expressionless basic face shape, weights of face shape parameters of the facial image in each video frame image of the template video, and preset face shape parameters; generate a template with-expression 3D face mesh of the facial image in each video frame image of the template video by using the weights of face shape parameters of the facial image in each video frame image of the template video and the preset face shape parameters, and weights of the facial expression parameters of the facial image in each video frame image of the template video and preset facial expression parameters; perform blending processing for the template expressionless 3D face mesh and the template with-expression 3D face mesh to obtain the template 3D face mesh of the facial image in each video frame image of the template video; use the template 3D face meshes to perform sampling processing for the facial image in each video frame image of the template video to obtain the template texture of the template 3D face mesh.

It needs to be appreciated that the method in the embodiment corresponding to FIG. 1 may be implemented by the video blending apparatus according to the present embodiment. Reference may be made to relevant contents in the embodiment corresponding to FIG. 1 for detailed description, which will not be detailed any longer here.

In the present embodiment, the 3D face mesh can be used to predict the face after the posture change to provide a better robustness to a larger face posture change, thereby enhancing the blending effect of the video blending.

In addition, according to the technical solution provided by the present disclosure, the predicted 3D face mesh of the facial image in each video frame image of the user video is obtained according to each video frame image of the user video and each video frame image of the template video, so that the built 3D face mesh can simultaneously have facial features of the user video and facial features of the template video, and the blending effect of video blending can be further enhanced.

In addition, according to the technical solution provided by the present disclosure, the predicted texture after the blending processing of the user texture obtained according to the user video and the template texture obtained according to the template video is used to enable features of the template texture to be blended into the user texture, thereby further improving the blending effect of the video blending.

In addition, according to the technical solution provided by the present disclosure, with the smoothing processing being performed on the predicted texture after the blending processing of the user texture obtained according to the user video and the template texture obtained according to the template video, texture discontinuity caused by discontinuity of face postures of facial images in the video frame images may be weakened, and thereby the occurrence of a jitter phenomenon of face color may be avoided.

In addition, according to the technical solution provided by the present disclosure, a blending effect between a user face edge in the blended video and the template background in the template video can be effectively improved by performing blending processing according to the face image mask having a fixed shape and preset according to facial feature positions of face textures, in cooperation with the rendered face image of the predicted 3D face mesh and each video frame image of the template video.

In addition, according to the technical solution provided by the present disclosure, the user experience can be effectively improved.

According to embodiments of the present disclosure, the present disclosure further provides an electronic device and a non-transitory computer readable storage medium in which computer instructions are stored.

Figure 3:
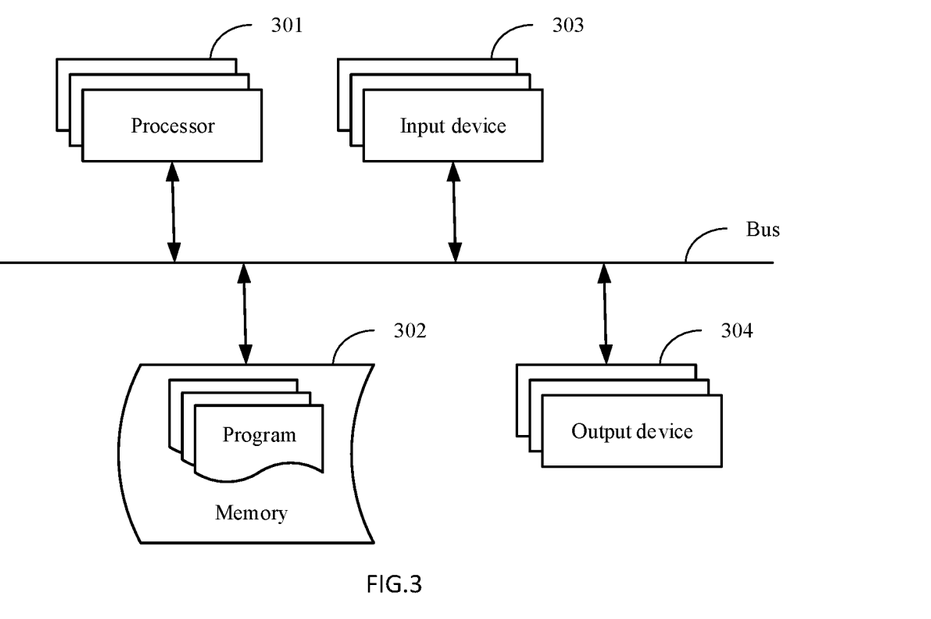
FIG. 3 illustrates a schematic diagram of an electronic device for implementing the video blending method according to embodiments of the present disclosure.

As shown in FIG. 3, it shows a block diagram of an electronic device for the video blending method according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 3, the electronic device comprises: one or more processors 301, a memory 302, and interfaces connected to components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 301 is taken as an example in FIG. 3.

The memory 302 is a non-transitory computer-readable storage medium provided by the present disclosure. Wherein, the memory stores instructions executable by at least one processor, so that the at least one processor executes the video blending method provided by the present disclosure. The non-transitory computer-readable storage medium of the present disclosure stores computer instructions, which are used to cause a computer to execute the video blending method according to the present disclosure.

The memory 302 is a non-transitory computer-readable storage medium and can be used to store non-transitory software programs, non-transitory computer executable programs and modules, such as program instructions/modules corresponding to the video blending method in embodiments of the present disclosure (e.g., the 3D prediction unit 201, the texture prediction unit 202, the projection rendering unit 203, the image blending unit 204 and the video synthesis unit 205). The processor 301 executes various functional applications and data processing of the server, i.e., implements the video blending method in the above method embodiment, by running the non-transitory software programs, instructions and units stored in the memory 302.

The memory 302 may include a storage program region and a storage data region, wherein the storage program region may store an operating system and an application program needed by at least one function; the storage data region may store data created according to the use of the electronic device for implementing the video blending method according to the embodiment of the present disclosure. In addition, the memory 302 may include a high-speed random access memory, and may also include a non-transitory memory, such as at least one magnetic disk storage device, a flash memory device, or other non-transitory solid-state storage device. In some embodiments, the memory 302 may optionally include a memory remotely arranged relative to the processor 301, and these remote memories may be connected to the electronic device for implementing the video blending method according to embodiments of the present disclosure through a network. Examples of the above network include, but are not limited to, the Internet, an intranet, a local area network, a mobile communication network, and combinations thereof.

The electronic device for implementing the video blending method may further include an input device 303 and an output device 304. The processor 301, the memory 302, the input device 303 and the output device 304 may be connected through a bus or in other manners. In FIG. 3, the connection through the bus is taken as an example.

The input device 303 may receive inputted numeric or character information and generate key signal inputs related to user settings and function control of the electronic device for implementing the video blending method according to the embodiment of the present disclosure, and may be an input device such as a touch screen, keypad, mouse, trackpad, touchpad, pointing stick, one or more mouse buttons, trackball and joystick. The output device 304 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

According to technical solutions of embodiments of the present disclosure, the 3D face mesh can be used to predict the face after the posture change to provide a better robustness to a larger face posture change, thereby enhancing the blending effect of the video blending.

In addition, according to the technical solutions provided by the present disclosure, the predicted 3D face mesh of the facial image in each video frame image of the user video is obtained according to each video frame image of the user video and each video frame image of the template video, so that the built 3D face mesh can simultaneously have facial features of the user video and facial features of the template video, and the blending effect of video blending can be further enhanced.

In addition, according to the technical solutions provided by the present disclosure, the predicted texture after the blending processing of the user texture obtained according to the user video and the template texture obtained according to the template video is used to enable features of the template texture to be blended into the user texture, thereby further improving the blending effect of the video blending.

In addition, according to the technical solutions provided by the present disclosure, with the smoothing processing being performed on the predicted texture after the blending processing of the user texture obtained according to the user video and the template texture obtained according to the template video, texture discontinuity caused by discontinuity of face postures of facial images in the video frame images may be weakened, and thereby the occurrence of a jitter phenomenon of face color may be avoided.

In addition, according to the technical solutions provided by the present disclosure, a blending effect between a user face edge in the blended video and the template background in the template video can be effectively improved by performing blending processing according to the face image mask having a fixed shape and preset according to facial feature positions of face textures, in cooperation with the rendered face image of the predicted 3D face mesh and each video frame image of the template video.

In addition, according to the technical solution provided by the present disclosure, the user experience can be effectively improved.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A video blending method, wherein the method comprises:
    obtaining a predicted 3D face mesh of a facial image in each video frame image of a user video according to each video frame image of the user video and each video frame image of a template video;
    obtaining a predicted texture of each predicted 3D face mesh according to a user texture of a user 3D face mesh of the facial image in each video frame image of the user video and a template texture of a template 3D face mesh of the facial image in each video frame image of the template video;
    obtaining a rendered facial image of each predicted 3D face mesh according to each predicted 3D face mesh, the predicted texture of each predicted 3D face mesh and a user face posture of the facial image in each video frame image of the user video, and a template face posture of the facial image in each video frame image of the template video;
    performing blending processing for the rendered facial image of each predicted 3D face mesh and each video frame image of the template video to obtain each blended video frame image after the blending; and
    performing synthesis processing for each blended video frame image to obtain a blended video,
    wherein the performing blending processing for the rendered facial image of each predicted 3D face mesh and each video frame image of the template video to obtain each blended video frame image after the blending comprises:
        obtaining a rendered mask image of the facial image in each video frame image of the user video according to a preset facial image mask, the predicted 3D face mesh of the facial image in each video frame image of the user video and a user face posture, and a template face posture of the facial image in each video frame image of the template video; and
        performing blending processing on the rendered mask image of the facial image in each video frame image of the user video, a rendered face image of each predicted 3D face mesh and each video frame image of the template video to obtain each blended video frame image after the blending, and
    wherein the obtaining a rendered mask image of the facial image in each video frame image of the user video according to a preset facial image mask, the predicted 3D face mesh of the facial image in each video frame image of the user video and a user face posture, and a template face posture of the facial image in each video frame image of the template video comprises:
        obtaining a posture adjustment parameter according to the user face posture and the template face posture;
        performing posture adjustment processing on a blended face posture of the predicted 3D face mesh of the facial images in the each video frame image of the user video according to the posture adjustment parameter to adjust the blended face posture from the user face posture to the template face posture;
        performing posture adjustment processing on a preset mask face posture of the face image mask according to the posture adjustment parameter to adjust the mask face posture to the template face posture; and
        performing projection processing on the face image mask after the posture adjustment processing and the predicted 3D face mesh of the facial image in each video frame image of the user video to obtain a rendered mask image of the facial image in each video frame image of the user video,
    wherein the face image mask is a face image mask having a fixed shape and preset according to facial feature positions of face textures, and a facial image range reserved for blending is preset.

2. The method according to claim 1, wherein the obtaining a predicted texture of each predicted 3D face mesh according to a user texture of a user 3D face mesh of the facial image in each video frame image of the user video and a template texture of a template 3D face mesh of the facial image in each video frame image of the template video comprises:
    performing balance processing for the user texture of each user 3D face mesh according to the template texture of each template 3D face mesh to obtain the predicted texture of each predicted 3D face mesh; or
    performing blending processing on the user texture of each user 3D face mesh and the template texture of each template 3D face mesh to obtain the predicted texture of each predicted 3D face mesh.

3. The method according to claim 1, wherein after the obtaining a predicted texture of each predicted 3D face mesh according to a user texture of a user 3D face mesh of the facial image in each video frame image of the user video and a template texture of a template 3D face mesh of the facial image in each video frame image of the template video, the method further comprises:
    performing smoothing processing on the predicted texture of each predicted 3D face mesh.

4. The method according to claim 1, wherein the obtaining a rendered facial image of each predicted 3D face mesh according to each predicted 3D face mesh, the predicted texture of each predicted 3D face mesh and a user face posture of the facial image in each video frame image of the user video, and a template face posture of the facial image in each video frame image of the template video comprises:

obtaining a posture adjustment parameter according to the user face posture and the template face posture;

performing posture adjustment processing on a blended face posture of the predicted 3D face mesh in the facial image in each video frame image of the user video according to the posture adjustment parameter to adjust the blended face posture from the user face posture to the template face posture;

performing projection processing on the predicted 3D face mesh of the facial image in each video frame image of the user video after the posture adjustment processing; and performing rendering processing on a projection result of the projection processing by using the predicted texture of each predicted 3D face mesh to obtain the rendered facial image of each predicted 3D face mesh.

5. The method according to claim 1, wherein the obtaining a predicted 3D face mesh of a facial image in each video frame image of a user video according to each video frame image of a user video and each video frame image of a template video comprises:

obtaining key points of the facial image in each video frame image of the user video and key points of the facial images in each video frame image of the template video correspondingly according to each video frame image of the user video and each video frame image of the template video, respectively;

performing face fitting processing on the key points of the facial image in each video frame image of the user video and key points of the facial image in each video frame image of the template video, respectively, to obtain face prediction parameters of the facial images in each video frame image of the user video and face prediction parameters of the facial image in each video frame image of the template video; wherein the face prediction parameters include a weight of a face shape parameter, a weight of a facial expression parameter and a face rotation parameter; and obtaining a predicted 3D face mesh of the facial image in each video frame image of the user video according to the weight of the face shape parameter and the weight of the facial expression parameter of the facial image in each video frame image of the user video, and a weight of the face shape parameter of the facial image in each video frame image of the template video.

6. The method according to claim 5, wherein before obtaining a predicted texture of each predicted 3D face mesh according to a user texture of a user 3D face mesh of the facial image in each video frame image of the user video and a template texture of a template 3D face mesh of the facial image in each video frame image of the template video, the method further comprises:

generating a user expressionless 3D face mesh of the facial image in each video frame image of the user video by using a preset expressionless basic face shape, weights of face shape parameters of the facial images in the video frame images of the user video, and preset face shape parameters;

generating a user with-expression 3D face mesh of the facial image in each video frame image of the user video by using the weights of face shape parameters of the facial image in each video frame image of the user video and preset face shape parameters, and weights of the facial expression parameters of the facial image in each video frame image of the user video and preset facial expression parameters;

performing blending processing for the user expressionless 3D face mesh and the user with-expression 3D face mesh to obtain the user 3D face mesh of the facial image in each video frame image of the user video; and using the user 3D face meshes to perform sampling processing for the facial image in each video frame image of the user video to obtain the user texture of each user 3D face mesh.

7. The method according to claim 6, wherein the obtaining a predicted 3D face mesh of the facial image in each video frame image of the user video according to the weight of the face shape parameter and the weight of the facial expression parameter of the facial image in each video frame image of the user video, and a weight of the face shape parameter of the facial image in each video frame image of the template video comprises:

generating a user expressionless 3D face mesh of the facial image in each video frame image of the user video by using a preset expressionless basic face shape, weights of face shape parameters of the facial image in each video frame image of the user video, and preset face shape parameters;

generating a template expressionless 3D face mesh of the facial image in each video frame image of the template video by using the preset expressionless basic face shape, weights of face shape parameters of the facial image in each video frame image of the template video and preset face shape parameters;

performing blending processing for the user expressionless 3D face mesh and the template expressionless 3D face mesh to obtain a blended expressionless 3D face mesh;

obtaining a blended with-expression 3D face mesh according to the blended expressionless 3D face mesh, and weights of facial expression parameters of the facial image in each video frame image of the user video, and preset facial expression parameters; and performing blending processing for the blended with-expression 3D face mesh and the user 3D face mesh to obtain the predicted 3D face mesh of the facial image in each video frame image of the user video.

8. The method according to claim 5, wherein before obtaining a predicted texture of each predicted 3D face mesh according to a user texture of a user 3D face mesh of the facial image in each video frame image of the user video and a template texture of a template 3D face mesh of the facial image in each video frame image of the template video, the method further comprises:

generating a template expressionless 3D face mesh of the facial image in each video frame image of the template video by using a preset expressionless basic face shape, weights of face shape parameters of the facial image in each video frame image of the template video, and preset face shape parameters;

generating a template with-expression 3D face mesh of the facial image in each video frame image of the template video by using the weights of face shape parameters of the facial image in each video frame image of the template video and the preset face shape parameters, and weights of the facial expression parameters of the facial image in each video frame image of the template video and preset facial expression parameters;

performing blending processing for the template expressionless 3D face mesh and the template with-expression 3D face mesh to obtain the template 3D face mesh of the facial image in each video frame image of the template video; and using the template 3D face meshes to perform sampling processing for the facial image in each video frame image of the template video to obtain the template texture of the template 3D face mesh.

9. An electronic device, comprising
at least one processor; and
a memory communicatively connected with the at least one processor;
wherein the memory stores instructions executable by the at least one processor, and the instructions are executed by the at least one processor to enable the at least one processor to perform a video blending method, wherein the method comprises:
obtaining a predicted 3D face mesh of a facial image in each video frame image of a user video according to each video frame image of the user video and each video frame image of a template video;
obtaining a predicted texture of each predicted 3D face mesh according to a user texture of a user 3D face mesh of the facial image in each video frame image of the user video and a template texture of a template 3D face mesh of the facial image in each video frame image of the template video;
obtaining a rendered facial image of each predicted 3D face mesh according to each predicted 3D face mesh, the predicted texture of each predicted 3D face mesh and a user face posture of the facial image in each video frame image of the user video, and a template face posture of the facial image in each video frame image of the template video;
performing blending processing for the rendered facial image of each predicted 3D face mesh and each video frame image of the template video to obtain each blended video frame image after the blending; and
performing synthesis processing for each blended video frame image to obtain a blended video,
wherein the performing blending processing for the rendered facial image of each predicted 3D face mesh and each video frame image of the template video to obtain each blended video frame image after the blending comprises:
obtaining a rendered mask image of the facial image in each video frame image of the user video according to a preset facial image mask, the predicted 3D face mesh of the facial image in each video frame image of the user video and a user face posture, and a template face posture of the facial image in each video frame image of the template video; and
performing blending processing on the rendered mask image of the facial image in each video frame image of the user video, a rendered face image of each predicted 3D face mesh and each video frame image of the template video to obtain each blended video frame image after the blending, and
wherein the obtaining a rendered mask image of the facial image in each video frame image of the user video according to a preset facial image mask, the predicted 3D face mesh of the facial image in each video frame image of the user video and a user face posture, and a template face posture of the facial image in each video frame image of the template video comprises:
obtaining a posture adjustment parameter according to the user face posture and the template face posture;

performing posture adjustment processing on a blended face posture of the predicted 3D face mesh of the facial images in the each video frame image of the user video according to the posture adjustment parameter to adjust the blended face posture from the user face posture to the template face posture;
performing posture adjustment processing on a preset mask face posture of the face image mask according to the posture adjustment parameter to adjust the mask face posture to the template face posture; and
performing projection processing on the face image mask after the posture adjustment processing and the predicted 3D face mesh of the facial image in each video frame image of the user video to obtain a rendered mask image of the facial image in each video frame image of the user video,
wherein the face image mask is a face image mask having a fixed shape and preset according to facial feature positions of face textures, and a facial image range reserved for blending is preset.

10. The electronic device according to claim 9, wherein the obtaining a predicted texture of each predicted 3D face mesh according to a user texture of a user 3D face mesh of the facial image in each video frame image of the user video and a template texture of a template 3D face mesh of the facial image in each video frame image of the template video comprises:
performing balance processing for the user texture of each user 3D face mesh according to the template texture of each template 3D face mesh to obtain the predicted texture of each predicted 3D face mesh; or
performing blending processing on the user texture of each user 3D face mesh and the template texture of each template 3D face mesh to obtain the predicted texture of each predicted 3D face mesh.

11. The electronic device according to claim 9, wherein after the obtaining a predicted texture of each predicted 3D face mesh according to a user texture of a user 3D face mesh of the facial image in each video frame image of the user video and a template texture of a template 3D face mesh of the facial image in each video frame image of the template video, the method further comprises:
performing smoothing processing on the predicted texture of each predicted 3D face mesh.

12. The electronic device according to claim 9, wherein the obtaining a rendered facial image of each predicted 3D face mesh according to each predicted 3D face mesh, the predicted texture of each predicted 3D face mesh and a user face posture of the facial image in each video frame image of the user video, and a template face posture of the facial image in each video frame image of the template video comprises:
obtaining a posture adjustment parameter according to the user face posture and the template face posture;
performing posture adjustment processing on a blended face posture of the predicted 3D face mesh in the facial image in each video frame image of the user video according to the posture adjustment parameter to adjust the blended face posture from the user face posture to the template face posture;
performing projection processing on the predicted 3D face mesh of the facial image in each video frame image of the user video after the posture adjustment processing; and
performing rendering processing on a projection result of the projection processing by using the predicted texture of each predicted 3D face mesh to obtain the rendered facial image of each predicted 3D face mesh.

13. The electronic device according to claim 9, wherein the obtaining a predicted 3D face mesh of a facial image in each video frame image of a user video according to each video frame image of a user video and each video frame image of a template video comprises:
   obtaining key points of the facial image in each video frame image of the user video and key points of the facial images in each video frame image of the template video correspondingly according to each video frame image of the user video and each video frame image of the template video, respectively;
   performing face fitting processing on the key points of the facial image in each video frame image of the user video and key points of the facial image in each video frame image of the template video, respectively, to obtain face prediction parameters of the facial images in each video frame image of the user video and face prediction parameters of the facial image in each video frame image of the template video; wherein the face prediction parameters include a weight of a face shape parameter, a weight of a facial expression parameter and a face rotation parameter; and
   obtaining a predicted 3D face mesh of the facial image in each video frame image of the user video according to the weight of the face shape parameter and the weight of the facial expression parameter of the facial image in each video frame image of the user video, and a weight of the face shape parameter of the facial image in each video frame image of the template video.

14. The electronic device according to claim 13, wherein before obtaining a predicted texture of each predicted 3D face mesh according to a user texture of a user 3D face mesh of the facial image in each video frame image of the user video and a template texture of a template 3D face mesh of the facial image in each video frame image of the template video, the method further comprises:
   generating a user expressionless 3D face mesh of the facial image in each video frame image of the user video by using a preset expressionless basic face shape, weights of face shape parameters of the facial images in the video frame images of the user video, and preset face shape parameters;
   generating a user with-expression 3D face mesh of the facial image in each video frame image of the user video by using the weights of face shape parameters of the facial image in each video frame image of the user video and preset face shape parameters, and weights of the facial expression parameters of the facial image in each video frame image of the user video and preset facial expression parameters;
   performing blending processing for the user expressionless 3D face mesh and the user with-expression 3D face mesh to obtain the user 3D face mesh of the facial image in each video frame image of the user video; and
   using the user 3D face meshes to perform sampling processing for the facial image in each video frame image of the user video to obtain the user texture of each user 3D face mesh.

15. The electronic device according to claim 14, wherein the obtaining a predicted 3D face mesh of the facial image in each video frame image of the user video according to the weight of the face shape parameter and the weight of the facial expression parameter of the facial image in each video frame image of the user video, and a weight of the face shape parameter of the facial image in each video frame image of the template video comprises:
   generating a user expressionless 3D face mesh of the facial image in each video frame image of the user video by using a preset expressionless basic face shape, weights of face shape parameters of the facial image in each video frame image of the user video, and preset face shape parameters;
   generating a template expressionless 3D face mesh of the facial image in each video frame image of the template video by using the preset expressionless basic face shape, weights of face shape parameters of the facial image in each video frame image of the template video and preset face shape parameters;
   performing blending processing for the user expressionless 3D face mesh and the template expressionless 3D face mesh to obtain a blended expressionless 3D face mesh;
   obtaining a blended with-expression 3D face mesh according to the blended expressionless 3D face mesh, and weights of facial expression parameters of the facial image in each video frame image of the user video, and preset facial expression parameters; and
   performing blending processing for the blended with-expression 3D face mesh and the user 3D face mesh to obtain the predicted 3D face mesh of the facial image in each video frame image of the user video.

16. A non-transitory computer-readable storage medium storing computer instructions therein, wherein the computer instructions are used to cause the computer to perform a video blending method, wherein the method comprises the following steps:
   obtaining a predicted 3D face mesh of a facial image in each video frame image of a user video according to each video frame image of the user video and each video frame image of a template video;
   obtaining a predicted texture of each predicted 3D face mesh according to a user texture of a user 3D face mesh of the facial image in each video frame image of the user video and a template texture of a template 3D face mesh of the facial image in each video frame image of the template video;
   obtaining a rendered facial image of each predicted 3D face mesh according to each predicted 3D face mesh, the predicted texture of each predicted 3D face mesh and a user face posture of the facial image in each video frame image of the user video, and a template face posture of the facial image in each video frame image of the template video;
   performing blending processing for the rendered facial image of each predicted 3D face mesh and each video frame image of the template video to obtain each blended video frame image after the blending; and
   performing synthesis processing for each blended video frame image to obtain a blended video,
   wherein the performing blending processing for the rendered facial image of each predicted 3D face mesh and each video frame image of the template video to obtain each blended video frame image after the blending comprises:
   obtaining a rendered mask image of the facial image in each video frame image of the user video according to a preset facial image mask, the predicted 3D face mesh of the facial image in each video frame image of the user video and a user face posture, and a template face posture of the facial image in each video frame image of the template video; and performing blending processing on the rendered mask image of the facial image in each video frame image of the user video, a rendered face image of each predicted 3D face mesh and each video frame image of the template video to obtain each blended video frame image after the blending, and wherein the obtaining a rendered mask image of the facial image in each video frame image of the user video according to a preset facial image mask, the predicted 3D face mesh of the facial image in each video frame image of the user video and a user face posture, and a template face posture of the facial image in each video frame image of the template video comprises:

obtaining a posture adjustment parameter according to the user face posture and the template face posture;

performing posture adjustment processing on a blended face posture of the predicted 3D face mesh of the facial images in the each video frame image of the user video according to the posture adjustment parameter to adjust the blended face posture from the user face posture to the template face posture;

performing posture adjustment processing on a preset mask face posture of the face image mask according to the posture adjustment parameter to adjust the mask face posture to the template face posture; and performing projection processing on the face image mask after the posture adjustment processing and the predicted 3D face mesh of the facial image in each video frame image of the user video to obtain a rendered mask image of the facial image in each video frame image of the user video, wherein the face image mask is a face image mask having a fixed shape and preset according to facial feature positions of face textures, and a facial image range reserved for blending is preset.

\* \* \* \* \*